(12) United States Patent
Lesher et al.

(10) Patent No.: US 7,179,431 B2
(45) Date of Patent: Feb. 20, 2007

(54) GAS TREATMENT DEVICE AND SYSTEM, AND METHOD FOR MAKING THE SAME

(75) Inventors: Eric J. Lesher, Holly, MI (US); Stephen J. Myers, Owosso, MI (US); Michael R. Foster, Columbiaville, MI (US); John Boehnke, Grand Blanc, MI (US)

(73) Assignee: Delphi Technologies, Inc., Troy, MI (US)

( * ) Notice: Subject to any disclaimer, the term of this patent is extended or adjusted under 35 U.S.C. 154(b) by 817 days.

(21) Appl. No.: 09/862,176

(22) Filed: May 21, 2001

(65) Prior Publication Data

US 2002/0172626 A1 Nov. 21, 2002

(51) Int. Cl.
*B01D 50/00* (2006.01)
*B01D 53/34* (2006.01)
*F01N 3/10* (2006.01)
*B21D 51/16* (2006.01)

(52) U.S. Cl. ............ 422/180; 422/179; 422/219; 422/221; 422/222; 60/299; 29/890

(58) Field of Classification Search .......... 29/890.08, 29/890
See application file for complete search history.

(56) References Cited

U.S. PATENT DOCUMENTS

| 4,347,219 A | * | 8/1982 | Noritake et al. ............ 422/180 |
| 5,557,847 A | * | 9/1996 | Koshiba et al. .............. 29/890 |
| 5,980,837 A | * | 11/1999 | Umin et al. ................. 422/179 |
| 6,159,430 A | | 12/2000 | Foster et al. |
| 6,338,827 B1 | | 1/2002 | Nelson |
| 6,354,903 B1 | | 3/2002 | Nelson |
| 6,361,821 B1 | | 3/2002 | Anderson et al. |
| 6,391,822 B1 | | 5/2002 | Dou et al. |
| 6,438,839 B1 | | 8/2002 | Hardesty et al. |
| 6,455,463 B1 | | 9/2002 | Labarge et al. |
| 6,464,945 B1 | | 10/2002 | Hemingway |
| 6,464,947 B2 | | 10/2002 | Balland |
| 6,497,847 B2 | | 12/2002 | Foster et al. |
| 6,532,659 B1 | | 3/2003 | DeSousa et al. |
| 6,591,497 B2 | | 7/2003 | Foster et al. |
| 6,605,259 B1 | | 8/2003 | Henry |
| 6,623,704 B1 | | 9/2003 | Roth |
| 6,624,113 B2 | | 9/2003 | Labarge et al. |
| 6,643,928 B2 | | 11/2003 | Hardesty et al. |
| 6,732,432 B2 | * | 5/2004 | Foster et al. .................. 29/890 |

OTHER PUBLICATIONS

Rhor-Kat Line, Comas, Costruzione Macchine Speciali, R. Riboldi, Mar. 31, 2000, 9 pages.
Wrapping Machine, COMAS, Costruzione Macchine Speciali, R. Riboldi, Mar. 31, 2000, 7 pages.

* cited by examiner

*Primary Examiner*—Alexa Neckel
*Assistant Examiner*—Kaity Handal
(74) *Attorney, Agent, or Firm*—Paul L. Marshall

(57) ABSTRACT

An embodiment of a method for producing a gas treatment device includes disposing a mat support material about a substrate to form a subassembly; passing at least a portion of the subassembly into a main body portion of a housing that has a first portion having a decreasing internal diameter from a first end to the main body portion, the main body portion extending from the first portion.

9 Claims, 5 Drawing Sheets

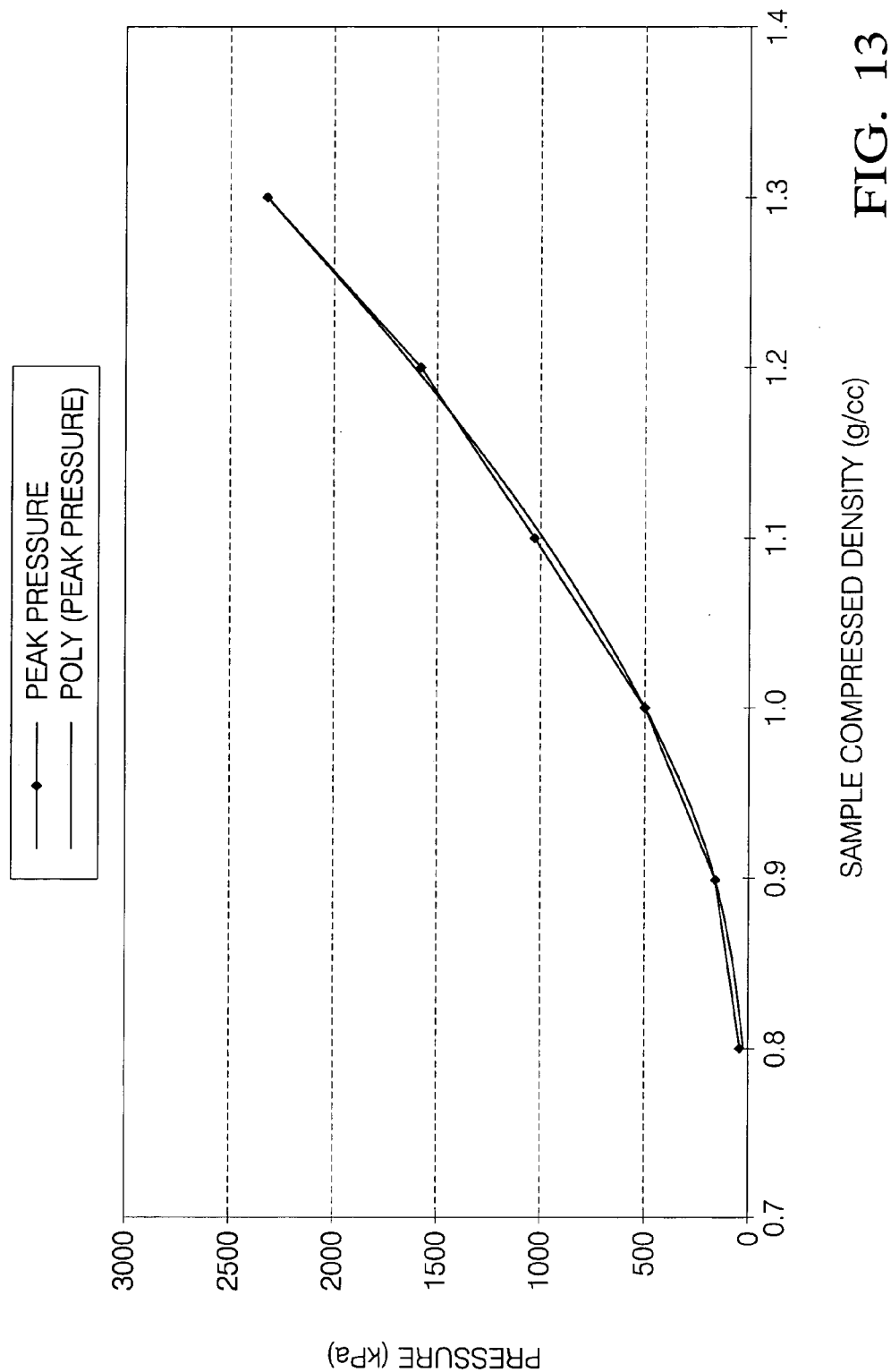

//<sub></sub>
GAS TREATMENT DEVICE AND SYSTEM, AND METHOD FOR MAKING THE SAME

BACKGROUND OF THE INVENTION

Gas treatment devices such as catalytic converters, evaporative emissions devices, hydrocarbon scrubbing devices, diesel particulate traps, non-thermal plasma reactors, and the like, are employed in various applications to catalytically treat environmentally unfriendly gas components. Such gas treatment devices incorporate a substrate, support, monolith, or brick, which includes a catalyst material coated thereon. A mounting device such as a mat support material comprising an intumescent material, non-intumescent material, or a combination of both, is disposed about the substrate, e.g., a mat support material/substrate subassembly, prior to being inserted into the gas treatment device's housing or shell. One method for inserting the mat support material/substrate subassembly into the housing comprises using a stuffing cone.

FIG. 1 illustrates a cross-sectional view of a stuffing cone 10 attached to a housing 12 for a gas treatment device. The stuffing cone compresses the abrasive, ceramic mat support material about the substrate so that the subassembly can be disposed into the housing. More particularly, as the mat support material/substrate subassembly slides against the inwardly tapered interior of the stuffing cone, the mat support material compresses about the substrate. As the mat support material compresses, it erodes the tapered interior of the stuffing cone. Eventually, the stuffing cone loses its ability to compress the mat support material about the substrate. Thus, stuffing cones are designed to have thick sidewalls, which narrow the diameter of the opening designed to attach to the housing.

Generally, the stuffing cone's diameter is less than the diameter of the smallest housing to compensate for the increased thickness of the stuffing cone's sidewalls. This design change causes the mat support material to exert over approximately six hundred pounds per square inch of force about the substrate. In contrast, it is predicted that the housing exerts over approximately one hundred pounds of pressure per square inch about the subassembly to retain it in place after disposal. The additional pressure exerted during the subassembly's compression in the stuffing cone reduces the mat support material's retentive capabilities, increases the over compression of the mat support material, and increases the probability of substrate breakage.

SUMMARY OF THE INVENTION

Disclosed herein is a method for producing a gas treatment device, and a gas treatment device and system. One embodiment of the method comprises: disposing a mat support material about a substrate to form a subassembly; passing at least a portion of the subassembly into a main body portion of a housing comprising a first portion having a decreasing internal diameter from a first end to the main body portion, the main body portion extending from the first portion.

One embodiment of the gas treatment device comprises: a substrate; a housing disposed concentrically about the substrate, the housing comprising a first portion having a decreasing internal diameter from a first end to a main body portion, the main body portion extending from the first portion; and a mat support material disposed concentrically about the substrate to form a subassembly, wherein the subassembly is at least partially disposed in the main body portion.

One embodiment of the gas treatment system, comprises: the gas treatment device and an exhaust system component in fluid communication with the housing.

The above described and other features are exemplified by the following figures and detailed description.

BRIEF DESCRIPTION OF THE DRAWINGS

Referring now to the figures wherein the like elements are numbered alike:

FIG. 13 is a graph depicting the relationship between compression pressure versus sample compressed density at peak force and 15 second relaxed force.

DESCRIPTION OF THE PREFERRED EMBODIMENT

A stuffing cone, and a gas treatment device for use therewith, that can prevent over-compression of a mat support material/substrate subassembly, and obtain maximum installed mat support material pressure, are disclosed. The stuffing cone comprises a conduit with an interior tapered inwardly from a first end to an opposing second end. The first end comprises a diameter large enough to accept a mat support material/substrate subassembly. The opposing second end comprises a diameter that is greater than the internal diameter of the main body of the housing for the gas treatment device.

In the alternative, the stuffing cone comprises a conduit having a first end and an opening having a first diameter. The interior tapers inwardly to form a second diameter that is less than the first diameter. The interior tapers inwardly until forming a portion that extends to form an opposing second end having a second opening. The second end and extended portion have a third diameter that is less than the second diameter of the stuffing cone.

The gas treatment device comprises a substrate comprising a catalyst, a housing and a mat support material disposed concentrically about the substrate to form a subassembly. The housing is disposed concentrically about the substrate, and comprises a first portion comprising decreasing internal diameter from a first end to a main body portion, with the main body portion extending from the first portion. At the first end is optionally disposed one or more apertures. The apertures, which render the first portion flexible and allow it to flex outward when the subassembly is passed therethrough, are disposed longitudinally from said first end toward the main body portion. The subassembly is at least partially disposed in the main body portion.

In the alternative, the housing has a first end having an opening and a first sidewall disposed about the opening, a main body portion extending therefrom, and a second portion extending from the first sidewall in a direction opposite the main body portion and having parallel sides and a second portion internal diameter equal to the first end internal diameter. In addition, the first sidewall comprises a first portion of decreasing internal diameter.

Figure 1:
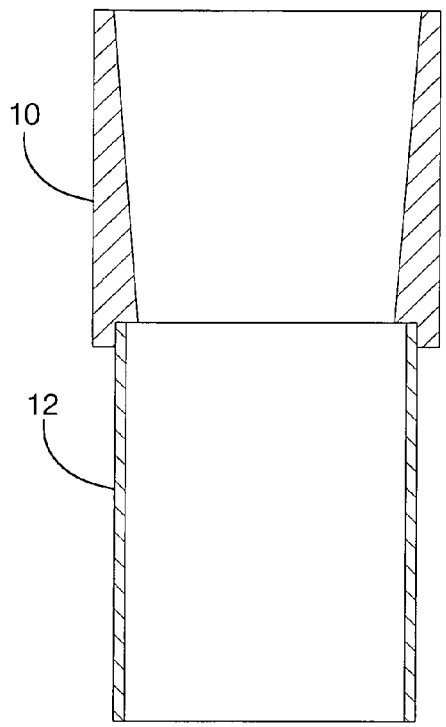
FIG. 1 is a cross-sectional view of a prior art stuffing cone attached to a housing for a gas treatment device.
Figure 2:
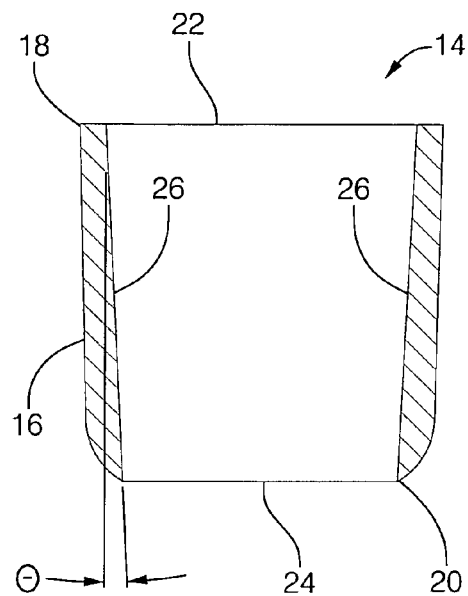
FIG. 2 is a cross-sectional view of a stuffing cone.

Referring now to FIG. 2, the stuffing cone 14 comprises a conduit 16 having one or more ends 18, 20 and an opening 22, 24 at each end. The stuffing cone 14 can have a shape sufficient to accept the mat support material/substrate subassembly, and allow the subassembly to pass through it into a housing of a gas treatment device. The stuffing cone 14 can possess a shape such as cylindrical, oval, conical, multi-sided (e.g., triangular, square, trapezoidal, pentagonal, hexagonal, heptagonal, octagonal, and the like, as well as combinations comprising at least one of the foregoing multi-sided shapes), and the like, as well as combinations comprising at least one of the foregoing shapes, and the like, with a truncated conical shape, or a combination of conical and cylindrical shape preferred. (See FIGS. 2 and 9).

The first end 18 of the stuffing cone 14 comprises an opening 22 capable of accepting a mat support material/substrate subassembly, which comprises a mat support material disposed about a substrate comprising a catalyst. The opening further comprises a geometry corresponding to the shape of the substrate. The interior 26 of the stuffing cone 14 is tapered inwardly from the opening of the first end 18 toward an opposing second end 20, such that the tapered sides of the stuffing cone narrow the internal diameter of the stuffing cone, e.g., the internal diameter of the first end 18 is greater than the internal diameter of the second end 20. The resulting cone internal diameter is greater than the internal diameter of the housing for the gas treatment device. The opposing second end 20 further comprises a second end 25 comprising an opening 24, comprising a geometry preferably corresponding to the shape of one or more ends of the housing 42 of the gas treatment device. The second end 25 can be tapered so that the second end 25 can be received by a housing 42 (See FIG. 8).

Figure 9:
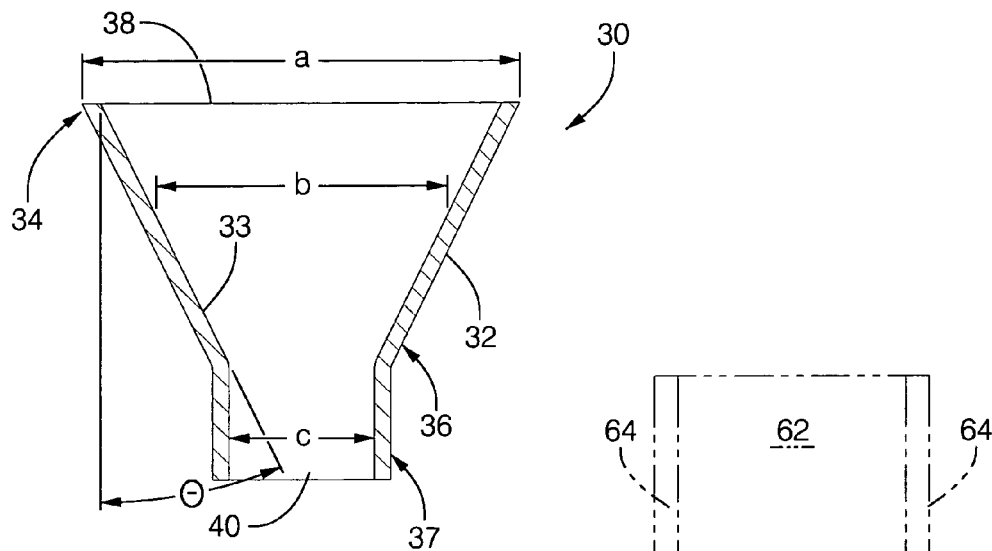
FIG. 9 is another alternative embodiment of the stuffing cone.
Figure 10:
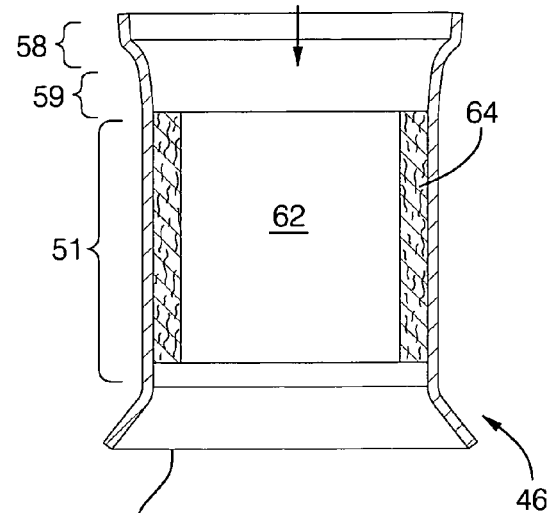
FIG. 10 is a cross-sectional view of a mat support material/substrate subassembly being disposed into the housing of FIG. 6.

In the alternative, a stuffing cone 30 comprises a conduit 32 having one or more ends 34, 36 and an opening 38, 40 at each end (See FIG. 9). The first end 34 includes an opening 38 having a first diameter "a". The interior tapers inwardly from the first opening 38 to form a second diameter "b" that is less than the first diameter "a". The interior tapers inwardly until forming a portion that extends to form an opposing second end 36 having a second opening 40. The second end 36 and extended portion have a third diameter "c" that is less than the second diameter "b" of the stuffing cone 30. The interior 33 of the stuffing cone 30 is tapered inwardly from the opening of the first end 34 toward an opposing second end 36, such that the tapered sides of the stuffing cone 30 narrow the internal diameter of the stuffing cone 30, e.g., the internal diameter "a" of the first end 34 is greater than the internal diameter "c" of the second end 36, with a portion 37 adjacent the second end 36 optionally having an internal diameter "c" equal to or less than the second end internal diameter "b". The resulting stuffing cone 30 internal diameter is greater than the internal diameter of the housing 40 for the gas treatment device.

Both stuffing cones 14 and 30 can have a sufficient length to receive the mat support material/substrate subassembly, and compress the mat support material about the substrate. Likewise, the first ends 18, 34 can have a sufficient diameter to receive the mat support material/substrate subassembly, and is preferably about equivalent to or greater than the size of the mat support material/substrate subassembly.

Figure 3:
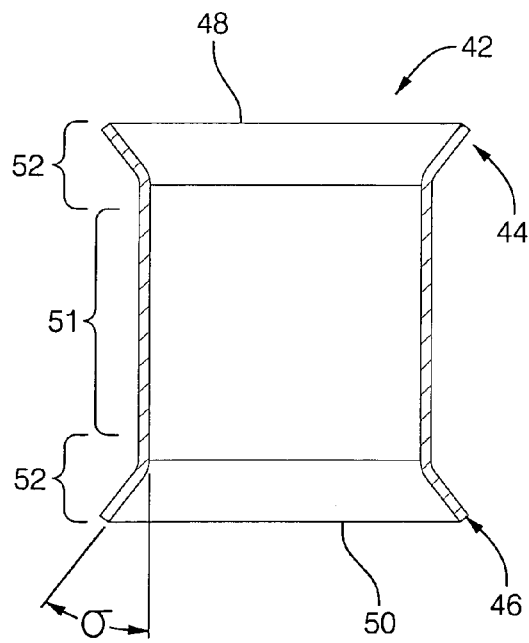
FIG. 3 is a cross-sectional view of a housing for a gas treatment device.

Although the openings 24, 40 of the second ends 20, 36 can be blunt, the openings 24, 40 preferably comprise a sufficient angle θ that can communicate with and be received by the housing 42. For example, the opening can be tapered to form an angle θ measuring about 10 degrees to about 60 degrees, and preferably about 20 degrees to about 50 degrees, and most preferably about 25 degrees to about 35 degrees. Referring now to FIG. 3, the gas treatment device comprises a housing 42 in which the mat support material/substrate subassembly can be disposed. The housing comprises a material that is capable of withstanding the type of gas, maximum temperature of the gas, maximum temperatures reached by the substrate, other related operating conditions including, but not limited to, resisting under-car salt, temperature, corrosion, and the like. Generally, ferrous materials are employed, such as ferritic stainless steels, and the like. Some possible ferritic stainless steels can include stainless steel grades such as the 400-Series, e.g., SS-409, SS-439 and SS-441, with grades SS-409 and SS-439 preferred. The size and shape of the housing comprises a size and shape corresponding to the size and shape of the compressed mat support material/substrate subassembly.

The housing 42 also further comprises one or more ends 44, 46 having an opening 48, 50, and a sidewall 52 disposed about the openings 44, 46, and a main body portion 51 located between the ends 44, 46. The end 44 can be placed in operable communication with the stuffing cones 14, 30. The ends 44, 46 comprise openings 48, 50 that correspond to the shape of ends 20, 36 of the stuffing cones 14, 30. Generally, the sidewall 52 can be flared, tapered and/or angled to increase the internal diameter of the housing a sufficient amount to enable receipt of the stuffing cone (See FIGS. 3 and 9). The sidewall 52 can also comprise a first portion of decreasing internal diameter leading to a main body portion internal diameter. The first end 44 can receive the second end 20, 36 of the stuffing cones 14, 30 (See FIGS. 7 and 8).

Figure 4:
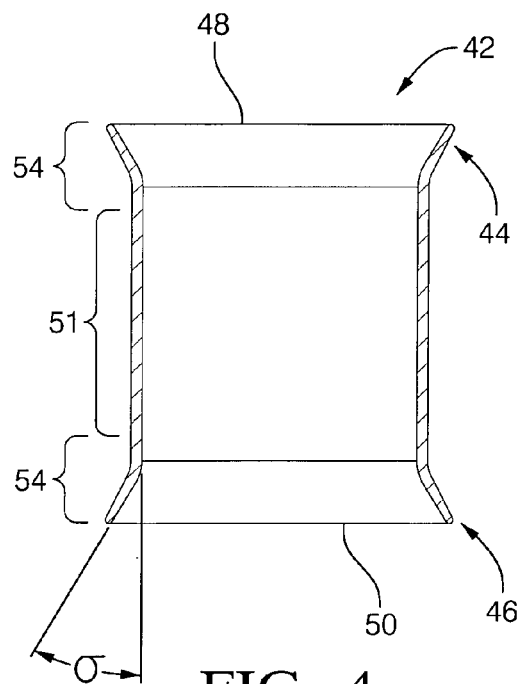
FIG. 4 is a cross-sectional view of an alternative embodiment of the housing of FIG. 3.
Figure 5:
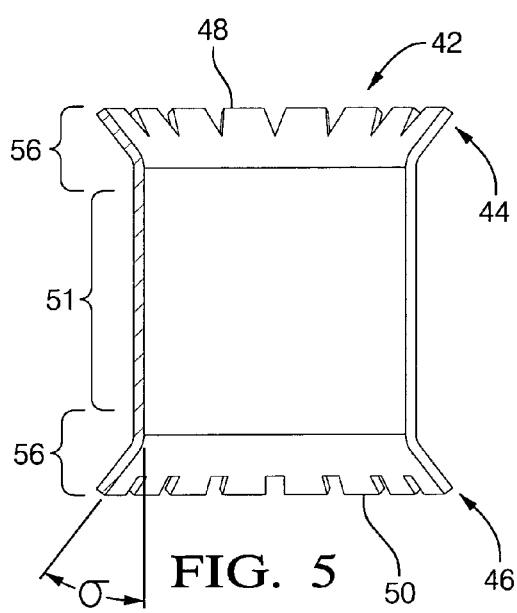
FIG. 5 is a cross-sectional view of another alternative embodiment of the housing of FIG. 3.
Figure 8:
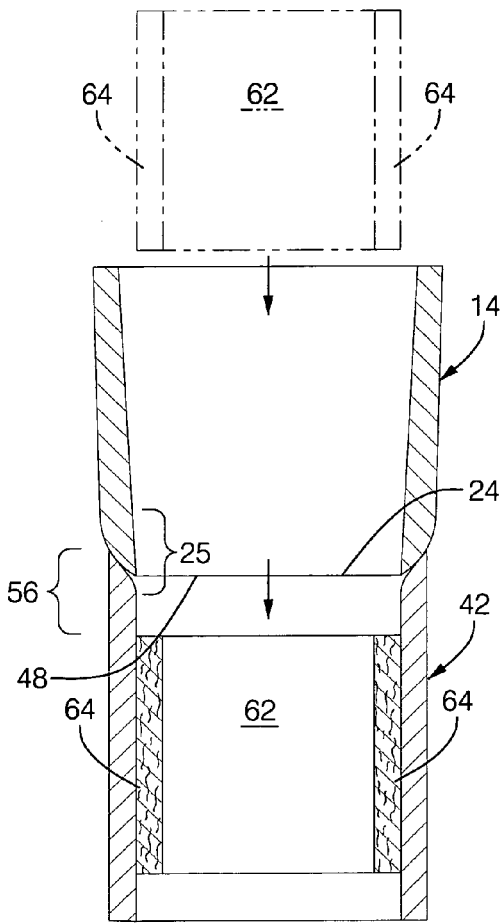
FIG. 8 is a cross-sectional view of a mat support material/substrate subassembly being disposed into an alternative embodiment of a stuffing cone in operable communication with an alternative embodiment of a housing for a gas treatment device.

In the alternative, a sidewall 54 or 56 can flare or taper at an angle and extend about the opening 48 sufficient to receive the second end 20, 36 of the stuffing cones 14, 30 (See FIGS. 4, 8 and 9). In FIGS. 3–6, the sidewalls 54, 56 can flare or taper at an angle σ of up to about 60 degrees, and preferably at an angle σ of about 30 degrees, and most preferably at an angle σ of about 20 degrees, and extend in a radial direction up to about 5 millimeters ("mm"), and preferably up to about 3 mm, and most preferably up to about 2 mm. The sidewalls 54, 56 also comprise a first portion of decreasing internal diameter leading to a main body portion internal diameter. Alternatively, the outer diameter of the first end 44 can be equivalent to the outer diameter of the housing 42 such that the housing has parallel sides (See FIG. 8).

Figure 6:
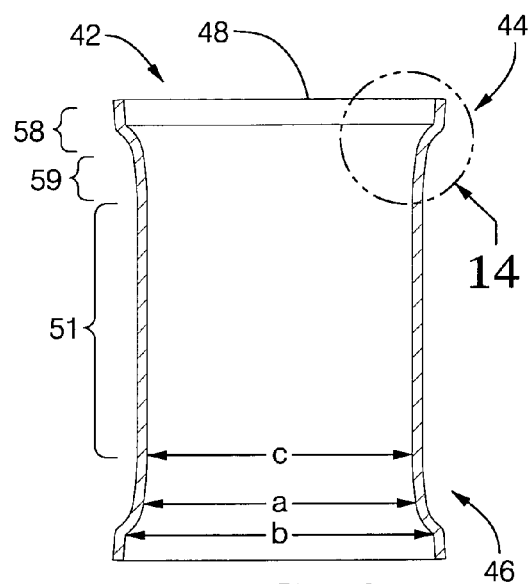
FIG. 6 is a cross-sectional view of yet another alternative embodiment of the housing of FIG. 3.

Referring specifically now to an alternative embodiment of the housing in FIG. 6, the housing can be designed to eliminate the need for a stuffing cone. The housing can comprise a first end 44 having an opening 48 and a first sidewall 59 disposed about the opening 48, a main body portion 51 extending therefrom, and a second portion 58 extending from the first sidewall 59 in a direction opposite the main body portion 51. The second portion 58 can have parallel sides and a second portion internal diameter equal to the first end internal diameter. The first sidewall 59 also comprises a first portion of decreasing internal diameter that leads to a main body portion internal diameter. The first portion of the first sidewall 59 has an internal diameter "a" that is less than the internal diameter "b" of the first end 44 of the housing, yet greater than the internal diameter "c" of the main body portion 51.

Figure 11:
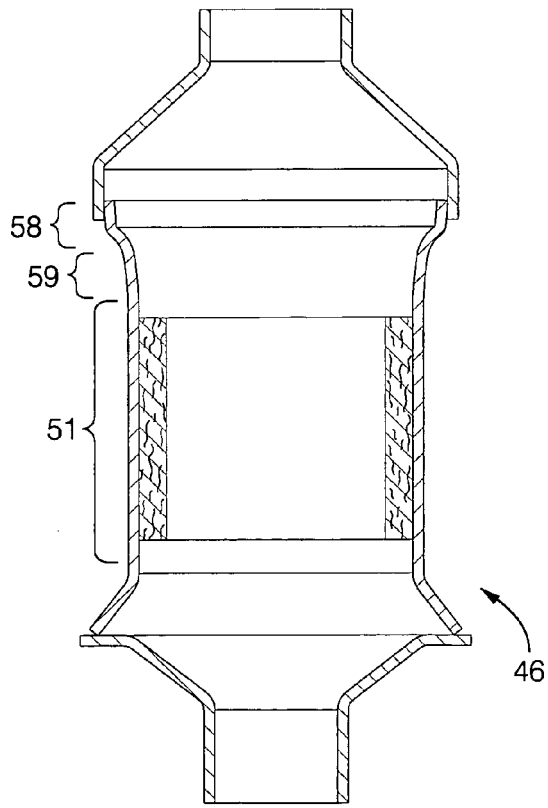
FIG. 11 is a cross-sectional view of a gas treatment device utilizing the housing of FIG. 6 and a pair of single walled end cone assemblies.
Figures 12, 14:
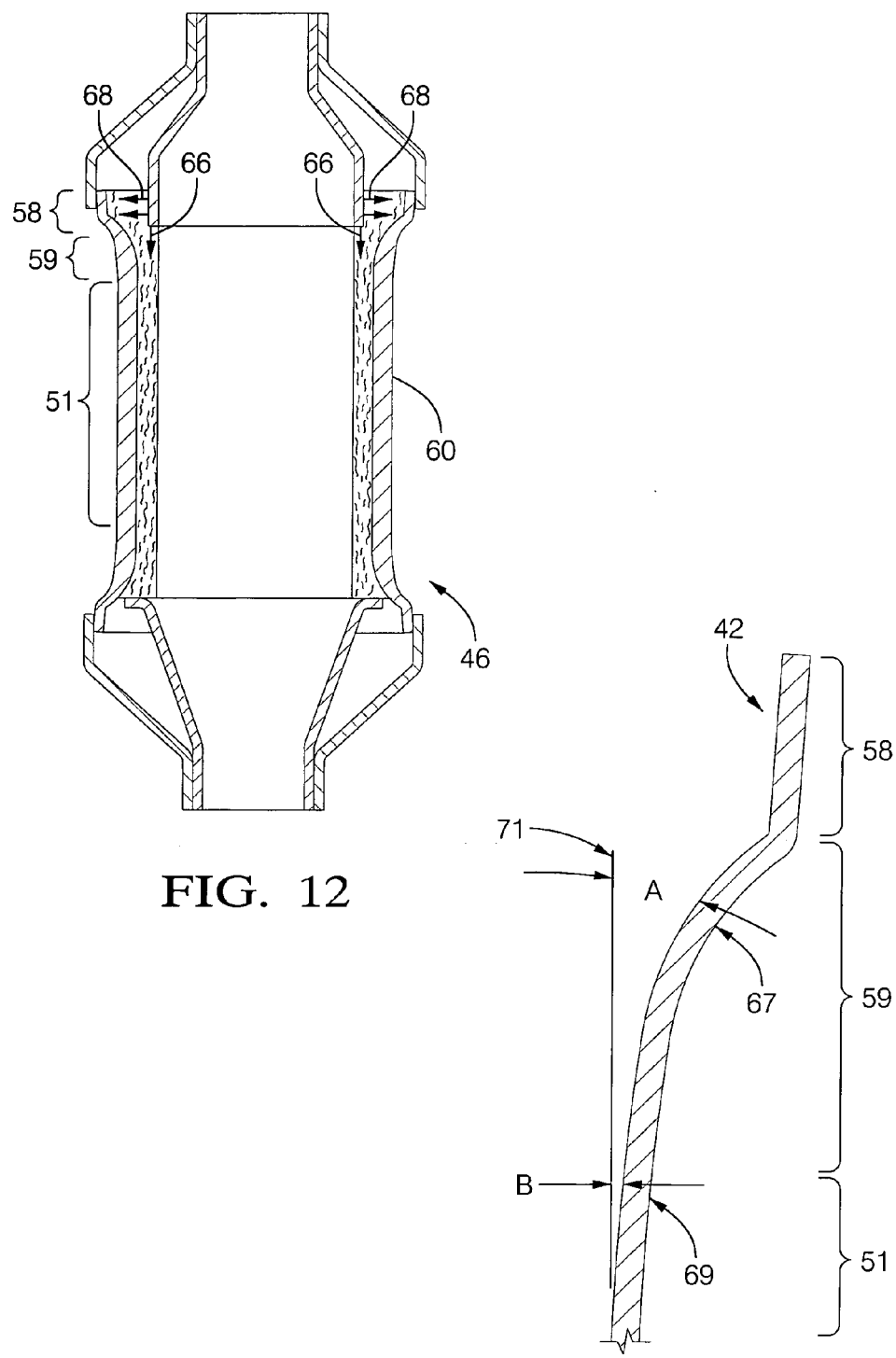
FIG. 12 is a cross-sectional view of a gas treatment device utilizing an alternative embodiment of the housing and a pair of dual-walled end cone assemblies.
FIG. 14 is an enlarged view of area 14—14 in FIG. 6 depicting a portion of the first sidewall.

Referring now to FIG. 14, which is an enlarged view of the first sidewall 59 of the housing 42 in FIGS. 6 and 10–12, the juncture where the second portion 58 and first sidewall 59 meet is referred to as a "cliff edge" where the housing material seems to "drop off". At that juncture the first portion of the first sidewall 59 further comprises a spline. The spline is the natural material flow area of the housing 42, or a smooth curve having a changing angle as measured from a line 71 parallel to the interior of the main body portion 51 (See FIG. 14). The spline's angle is sufficient to control the rate of compression of the mat support material about the substrate as the subassembly is disposed into the housing 42. The angle gradually decreases from the end of the second portion 58 to the beginning of the main body portion 51. The spline comprises a first angle of about 15 degrees to about 5 degrees at the juncture, and can decrease to a second angle of about 5 degrees to greater than 0 degrees upon reaching the main body portion 51. For example, the spline's first angle "A" can initially measure about 7 degrees and decreases to a second angle "B" of about 2 degrees; from about a point 67 to about a point 69 on the housing 42.

As the mat support material/substrate subassembly enters the housing and slides against the first sidewall 59, the mat support material will, preferably uniformly, compress about the substrate at a peak force while entering the main body portion 51 due to the decreasing angle of the spline. The decreasing angle of the spline gradually narrows the internal diameter of the housing 42, according to the natural material flow of the housing 42. This decreasing angle, in turn, gradually lessens the peak force applied to the substrate by the mat support material. The spline's decreasing angle is sufficient to control the compression rate of the mat support material about the substrate such that the peak force will approach the value of the predicted maximum compressive force applied by the housing to the subassembly after stuffing.

FIG. 13 is a graph depicting the relationship between compression pressure versus sample compressed density at peak force and 15 second relaxed force for a sample mat support material. Peak force is the force exerted at the time of rapid compression of the mat support material about the substrate during stuffing. The 15 second relaxed force corresponds to the pressure exerted by the mat support material upon the substrate fifteen seconds after rapid compression. This relaxed force value corresponds to a predicted maximum compressive force that the housing will maintain upon the mat support material/substrate subassembly. A sample of Interam® 100 mat support material, commercially available from 3M® Company, Minneapolis, Minn., having a basis weight of about 4,070 grams/meter squared ("g/m$^2$") was concentrically disposed about a sample substrate having and a diameter of about 5.08 centimeters was compressed, and a peak force and 15 second relaxed force were calculated.

As illustrated in the graph, Interam® 100 having a basis weight of about 4,070 g/m$^2$ exerts a peak force of about 2,000 kilopascals ("kpa") to about 2,500 kpa, or over about 300 pounds per square inch ("psi"), to form a gap bulk density of about 1.3 grams per cubic centimeter ("g/cc"). It is predicted that the housing maintains a maximum compressive force of about 105 psi about the mat support material/substrate subassembly. Consequently, a peak force corresponding to a gap bulk density of about 1.3 g/cc is too high and will likely result in the over compression of the mat support material and cause substrate breakage.

When employing the stuffing cone in combination with the housing, or a housing alone that embodies certain features of the stuffing cone, the mat support material can be compressed about the substrate to form a gap bulk density of about 1.2 g/cc or less. A gap bulk density of about 1.2 g/cc generally corresponds to a peak force of from about 1,000 kpa (150 psi) to about 1,400 kpa (200 psi). The resulting decrease in peak force is about 33% to about 50% less than the typical peak force applied to that Interam® 100 mat support material, which translates into a substantially smaller difference between the peak force and 15 second relaxed force. This substantially increases the likelihood that the mat support material will not be over compressed when disposed into housing 42.

As described above, a mat support material 64 is disposed concentrically about a substrate 62 to form the subassembly, which is disposed into the housing 42. The substrate 62 can comprise any material designed for use in a spark ignition or diesel engine environment, and have the following characteristics: (1) capable of operating at temperatures up to about 1,000° C.; (2) capable of withstanding exposure to hydrocarbons, nitrogen oxides, carbon monoxide, carbon dioxide, sulfur and/or sulfur oxides; and (3) having sufficient surface area and structural integrity to support the desired catalyst. Some possible materials include cordierite, silicon carbide, metallic foils, alumina sponges, porous glasses, and the like, and mixtures comprising at least one of the foregoing materials. Some ceramic materials include "HONEY CERAM", commercially available from NGK-Locke, Inc, Southfield, Mich., and "CELCOR", commercially available from Corning, Inc., Corning, N.Y.

Although the substrate 62 can have any size or geometry, the size and geometry are preferably chosen to optimize surface area in the given gas treatment device design parameters. Typically, the substrate has a honeycomb geometry, with the combs being any multi-sided or rounded shape, with substantially square, triangular, pentagonal, hexagonal, heptagonal, or octagonal or similar geometries preferred due to ease of manufacturing and increased surface area.

Disposed on and/or throughout the substrate 62 is a catalyst for controlling emissions levels. The catalyst may comprise one or more catalyst materials that are wash coated, imbibed, impregnated, physisorbed, chemisorbed, precipitated, or otherwise applied to the catalyst substrate. The particular catalyst(s) are chosen based upon the type of gas treatment device and its location in the vehicle. Possible catalyst materials include noble metals, such as platinum, palladium, rhodium, iridium, osmium, and ruthenium; other metals, such as tantalum, zirconium, yttrium, cerium, nickel, copper, and the like; active carbon, titanium dioxide ($TiO_2$) and the like; as well as metal oxides; alloys, and mixtures comprising of at least one of the foregoing catalysts, and the like. The catalyst can optionally include a base metal oxide for the reduction of nitrogen oxides.

Located in between substrate(s) 62 and the gas treatment device's housing is a mat support material 64 that insulates the housing from both the high exhaust gas temperatures and the exothermic catalytic reaction occurring within the substrate 62. The mat support material 64, which enhances the structural integrity of the substrate by applying compressive radial forces about it, reducing its axial movement, and retaining it in place, is concentrically disposed around the substrate to form a mat support material/substrate subassembly. The mat support material can either be an intumescent material, e.g., one which contains ceramic materials, and other conventional materials such as organic binders and the like, or combinations comprising at least one of the foregoing materials, and a vermiculite component that expands with heating to maintain firm uniform compression, or non-uniform compression, if desired, or a non-intumescent materials, which does not contain vermiculite, as well as materials which include a combination of both. Non-intumescent materials include materials such as those sold under the trademarks "NEXTEL" and "SAFFIL" by the "3M" Company, Minneapolis, Minn., or those sold under the trademark, "FIBERFRAX" and "CC-MAX" by the Unifrax Co., Niagara Falls, N.Y., and the like. Intumescent materials include materials, sold under the trademark "INTERAM" by the "3M" Company, Minneapolis, Minn., as well as those intumescents which are also sold under the aforementioned "FIBERFRAX" trademark, as well as combinations thereof and others.

The mat support material 64 is disposed concentrically about the substrate 62 to form the mat support material/substrate subassembly. Prior to disposing the mat support material/substrate subassembly into the stuffing cone 14, 30, the stuffing cone 14, 30 is preferably disposed in physical contact with at least a portion of the flared, tapered and/or angularly extend first end 44 of the housing (See FIGS. 7 and 8). For example, the stuffing cone 14 can be retained in contact with the gas treatment device using one or more methods such as pressure and the like. The stuffing cone 14 is preferably disposed so that it is aligned and centered with the housing.

Figure 7:
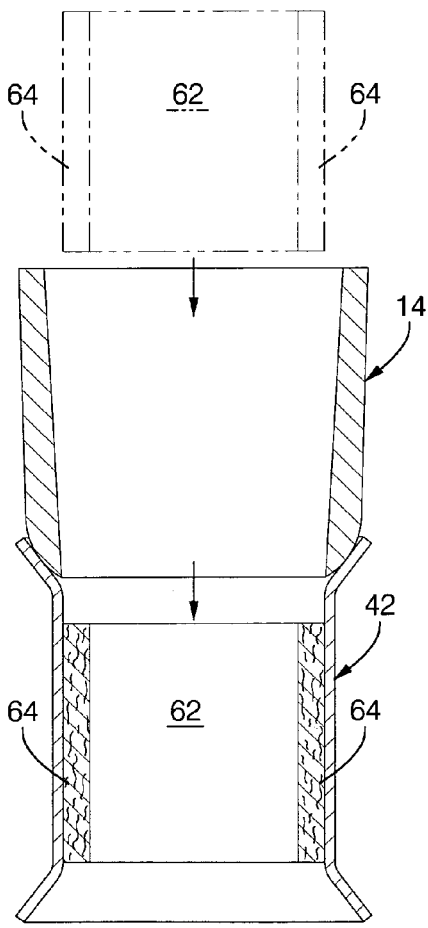
FIG. 7 is a cross-sectional view of a mat support material/substrate subassembly being disposed into the stuffing cone of FIG. 2 in operable communication with the housing of FIG. 3.

Referring to FIG. 7, the mat support material/substrate subassembly is disposed within the stuffing cone 14, and preferably into the opening 22 at the first end 18. The stuffing cone 14 compresses the mat support material about the substrate, and preferably compresses the mat support material uniformly about the substrate, before dispensing the mat support material/substrate subassembly into the housing. The mat support material/substrate subassembly preferably fits within the housing such that the mat support material does not extend beyond the flared, tapered and/or angularly extended portion of the housing. Alternatively, the mat support material 64 can extend beyond the flared, tapered and/or angularly extended portion where the internal diameter of the housing 42 is greater than the stuffing cone's second end internal diameter (See FIGS. 11 and 12).

When the mat support material 64 does extend into an area where the housing internal diameter is greater than the stuffing cone's second internal diameter, the exhaust gas system component can be disposed within the housing to interact with the mat support material. The exhaust gas system component (and mat protection device) can compensate for any likelihood that a non-uniform mount density of the mat support material may occur where the housing's internal diameter increases. In the alternative, and referring again to FIG. 10, the mat support material/substrate subassembly can also be disposed directly into the housing 42 without the stuffing cone when the housing 42 includes the straight section 58 and cliff edge-first side wall 59 such that a cliff is formed therebetween.

Since the stuffing cone's second end internal diameter is greater than the internal diameter of the main body portion 51 of the housing 40, the mat support material 64 will not experience over-compression when dispensed into the housing. When the internal diameter of the main body portion 51 exceeds the second end 20, 36, the mat support material 64 can potentially damage the substrate 62 and/or fail to achieve non-uniform mount density when compresed about the substrate 62. In contrast, the stuffing cone comprising a second end internal diameter greater than the main body portion 51 internal diameter eliminates the probability that over-compression will occur in the stuffing cone.

Once the mat support material/substrate subassembly is disposed within the housing, the stuffing cone 14 is removed. One or more ends 44, 46 of the housing can then optionally be sized to achieve the final compression of the mat support material 64. The sizing operation reduces the diameter of both ends of the housing such that the mat support material/substrate subassembly is uniformly compressed and maximun installation pressure of the mat support material about the substrate is maintained and/or achieved.

Upon completion of any sizing operation and installation of the subassembly each end of the gas treatment device can be individually attached and placed in fluid communication with a compatible exhaust system components to form a gas treatment system (See FIGS. 11 and 12). The exhaust system components can comprise a coupling apparatus, flexible coupling apparatus, connecting pipe, exhaust manifold assembly, end plate, end cone, as well as combinations comprising at least one of the foregoing exhaust system components, and the like employed alone or in combination with a mat protection device such as a mat protection ring, end ring, retainer ring, as well as combinations comprising at least one of the foregoing devices, and the like. The exhaust system component can attach to the straight section 58 of the flared, tapered and/or angularly extended end 44, 46 of the housing 42 (See FIG. 12). More particularly, the exhaust system component can preferably be welded to the exterior surface of the straight section 58.

When the mat support material extends beyond the main body portion 51 of the housing 42, the exhaust gas system component, e.g., a dual-walled endcone assembly comprising an inner end cone and an outer end cone, can be preferably inserted into the housing 42 such that the inner end cone either penetrates the mat support material 64 to a depth of up to about 6 mm, and preferably up to about 4 mm, and most preferably up to about 3 millimeters, and/or makes contact with a leading edge of the mat support material 64. The inner end cone exerts forces in the direction of arrows 66 and 68, which further compress the mat support material about the substrate (See FIG. 12). These forces will increase the mount density of the mat support material and ensure uniform compression of the mat support material about the substrate.

The stuffing cone, and gas treatment device for use with the stuffing cone, possesses several advantages such as reduced manufacturing costs, improved durability of gas treatment devices, eliminates need for specialized tools, eliminates potential manufacturing obstacles, and improves the focus of the manufacturing process, in contrast to other stuffing cone assemblies, and gas treatment devices for use therewith.

Manufacturing costs will be reduced using the stuffing cone and gas treatment device due to the expected reduction in substrate breakage. Since the probabilities exists that over-compression of the mat support material occurs or maximum installed mat support material pressure is not achieved, there exists the possibility that the substrate can break. However, the stuffing cone's second end diameter is greater than the internal diameter of the housing, which reduces and/or eliminates the probability that over-compression occurs or that the maximum installed mat support material pressure is not achieved. Consequently, as fewer substrates break or become crushed, manufacturing costs will decrease.

Another advantage is that the durability of the gas treatment device will improve. The mat support material achieves the maximum mat support material installed pressure when disposed into the gas treatment device using the stuffing cone. Since the mat retention forces applied by the mat support material about the substrate are maximized, the likelihood that the substrate will break during the device's useful life is diminished and the durability of the gas treatment device is improved. Additionally, since the mat support is not over compressed, the forces between the mat support and the stuffing cone are reduced, and the wear on the stuffing cone is also reduced.

Another advantage is that specialized tools to prevent over-compression and improve mat support material retention of the substrate become unnecessary. Such specialized tools increase manufacturing costs associated with time, labor, materials, and additional process steps to implement those tools. The stuffing cone and gas treatment devices are designed to attach to one another, thus eliminating the need for specialized tools. In addition, the mat support material/substrate subassembly can be disposed directly into housing embodying features of the stuffing cone. The gas treatment device having a flared end reduces and/or prevents the over-compression of mat support material and improves mat support material retention capabilities without the need for using additional tools.

Employing the stuffing cone and gas treatment device also eliminates potential manufacturing obstacles such as the probability that during disposal the mat support material will catch on the sidewall of the housing, or the mat support material may slip from the substrate, or the mat support material may bunch and collect in one area about the substrate. This, in turn, also reduces manufacturing costs related to problem-solving efforts required to overcome these obstacles such as additional time, labor, specialized tools and process steps.

Furthermore, the benefits of this manufacturing process are derived from the product, i.e., the gas treatment device produced, rather than the tooling, which translates into reduced costs on lower production runs.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method for producing a gas treatment device, comprising:
   disposing a mat support material about a substrate to form a subassembly;
   passing at least a portion of said subassembly into a main body portion of a housing comprising a first portion having a decreasing internal diameter from a first end to said main body portion, said main body portion extending from said first portion, wherein the passing comprises applying a compressive force to said subassembly at a rate corresponding to a portion angle of a spline of said first portion.

2. The method recited in claim 1, wherein said portion angle decreases from a first angle of about 15 degrees to about 5 degrees down to a second angle of about 5 degrees to greater than 0 degrees.

3. The method recited in claim 1, wherein said first portion has an outer diameter equivalent to a main body portion outer diameter.

4. A method for producing a gas treatment device, comprising:
   disposing a mat support material about a substrate to form a subassembly;
   passing said subassembly through and contacting said subassembly with a parallel portion of a stuffing cone assembly; and
   passing at least a portion of said subassembly into a main body portion of a housing comprising a first portion having a decreasing internal diameter from a first end to said main body portion;
   wherein said stuffing cone assembly comprises an assembly first internal diameter sufficient to accept said subassembly, and a stuffing cone second end having an assembly second internal diameter smaller than said first internal diameter; wherein said assembly second internal diameter is greater than a main body internal diameter; and wherein said parallel portion of said stuffing cone assembly comprises an internal diameter equivalent to said assembly second internal diameter.

5. A method for producing a gas treatment device, comprising:
   disposing a mat support material about a substrate to form a subassembly;
   passing at least a portion of said subassembly into a main body portion of a housing comprising a first portion having a decreasing internal diameter from a first end to said main body portion, said main body portion extending from said first portion;
   wherein said first portion comprises an aperture disposed longitudinally.

6. The method recited in claim 5, wherein said aperture is disposed from said first end toward said main body portion.

7. The method recited in claim 6, further comprising a plurality of said apertures.

8. The method recited in claim 7, further comprising flexing said first portion as said subassembly passes through said first portion.

9. A method for producing a gas treatment device, comprising:
   disposing a mat support material about a substrate to form a subassembly; and applying a compressive force to said subassembly by passing at least a portion of said subassembly past a first portion and into a main body portion of a housing, wherein said first portion comprises a spline having a portion angle that gradually decreases from a first angle of about 15 degrees to about 5 degrees down to a second angle of about 5 degrees to greater than 0 degrees.

* * * * *